United States Patent [19]
Jungjohann et al.

[11] 3,733,042
[45] May 15, 1973

[54] CAMERA STAND

[75] Inventors: Vernon H. Jungjohann, Rochester; Ronald E. Lohrman, Webster, both of N.Y.

[73] Assignee: Eastman Kodak Company, Rochester, N.Y.

[22] Filed: Aug. 2, 1971

[21] Appl. No.: 168,254

[52] U.S. Cl. ................... 248/181, 248/346, 312/328
[51] Int. Cl. ............................................. F16c 11/06
[58] Field of Search ..................... 248/181, 187, 176, 248/177, 178, 179, 346; 312/326, 327, 328; 95/86; 287/12, 21

[56] References Cited

UNITED STATES PATENTS

| 702,510 | 6/1902 | Tracy et al. | 232/17 |
|---|---|---|---|
| 1,851,445 | 3/1932 | Rappaport | 248/346 |
| 2,017,627 | 10/1935 | La Hodny | 287/12 |
| 2,045,013 | 6/1936 | Howland | 312/326 |
| 2,352,699 | 7/1944 | Ennis | 248/181 |

FOREIGN PATENTS OR APPLICATIONS

| 1,009,493 | 3/1952 | France | 248/179 |
|---|---|---|---|
| 632,954 | 7/1936 | Germany | 248/178 |

*Primary Examiner*—Marion Parsons, Jr.
*Attorney*—W. H. J. Kline, et al.

[57] ABSTRACT

A stand for supporting a photographic camera includes a recess for receiving and storing a cable release. The stand has a base and a support arm, with a ball head at one end of the support arm movably supported within bearing means in the base by a cover spring. The cover spring extends over a portion of the hollow interior of the base and thereby defines the recess for receiving and storing a cable release usable with the camera.

4 Claims, 9 Drawing Figures

PATENTED MAY 15 1973

VERNON H. JUNGJOHANN
RONALD E. LOHRMAN
INVENTORS

BY Robert F Brothers

W. H. J. Kline

ATTORNEYS AND AGENT

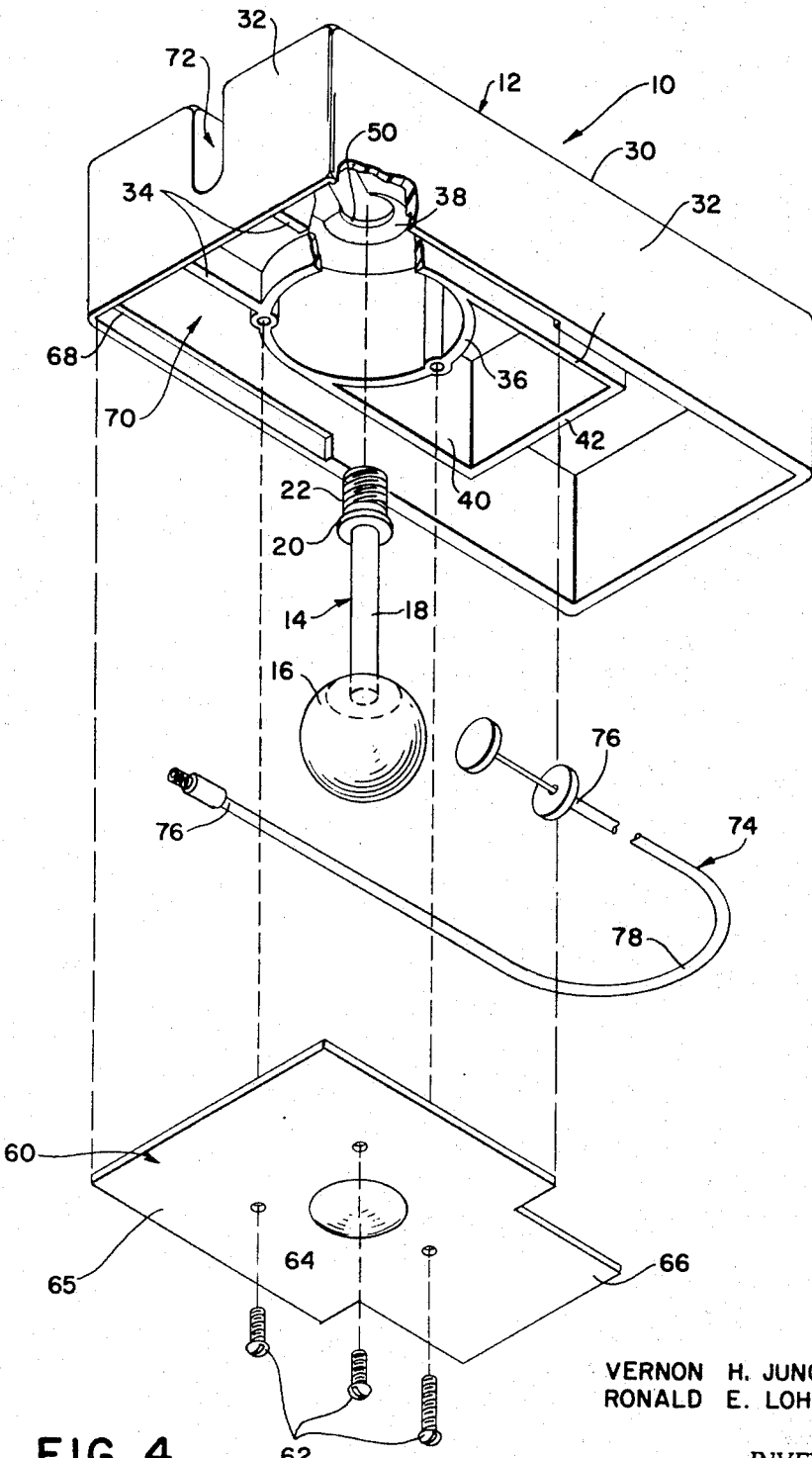

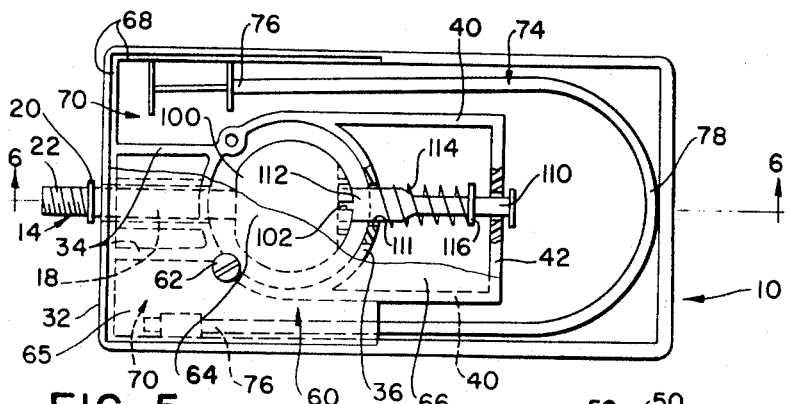

CAMERA STAND

CROSS REFERENCE TO RELATED APPLICATION

Reference is made to commonly assigned copending U.S. Pat. application Ser. No. 154,576, entitled, STAND FOR PHOTOGRAPHIC APPARATUS, filed in the name of Kurt Steisslinger et al.

BACKGROUND OF THE INVENTION

1. Field of the Invention

The present invention relates to photographic apparatus and in particular to a stand equipped to receive and support a photographic camera.

2. Description of the Prior Art

Camera stands, for example tripods, have long been the tool of the professional photographer or very advanced amateur who is willing to transport substantial amounts of equipment in order to do a quality job of picture taking.

However, with the popularization of electronic shutters, the least sophisticated of photographers can now make an accurate time exposure with a simple and inexpensive mechanism. The only new problem faced by the operator is camera movement. However, many cameras equipped with electronic shutters provide signals responsive to low scene light conditions which suggest to the photographer the use of a tripod and a cable release to make a time exposure, and such cameras now include sockets for receiving both types of accessories. The use of such accessories to make time exposures has extended the capabilities of a camera equipped with a narrow aperture lens to light conditions never before in its range.

Unlike the professional photographer, the purchaser of an inexpensive camera requires compactness and portability in all his equipment. He naturally resists carrying a tripod and a cable release with his small camera. U.S. Pat. application Ser. No. 154,576, filed June 1, 1971, entitled STAND FOR PHOTOGRAPHIC APPARATUS, Kurt Steisslinger et al., discloses a relatively simple camera stand which includes a support arm movably supported within a bearing in the base of the stand. The arm may be folded into the base for storage when the camera stand is not in use. The stand can be carried quite easily in a pocket or purse.

SUMMARY OF THE INVENTION

It is an object of the present invention to provide convenient portability for a cable release.

This and other objects are accomplished according to the invention by providing a camera support or stand with a recess for receiving and holding a cable release. Since the cable release and camera stand normally are used together, it is convenient to have one always available with the other.

According to a specific embodiment of the invention, a camera stand similar to that of the Steisslinger application is provided which includes a support base and a support arm which terminates at one end in a ball head which ball head is frictionally held within a bearing in the base by a cover spring. The support arm is rotatable into a recess within the support base for storage. The housing for this recess forms an additional recess defined in part by the cover spring for receiving a cable release.

The invention and its objects and advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings in which:

FIG. 4 is an exploded view of the camera stand of FIGS. 1—3;

FIG. 5 is a bottom view of a camera stand according to this invention, showing an anti-rotation pin associated with the ball head of the support arm;

FIG. 6 is a sectional view of the camera stand illustrated in FIG. 5;

FIG. 7 is an isolated view of the ball head, showing the slots formed in the ball head;

FIG. 8 is a sectional view of an alternate embodiment of an anti-rotation mechanism according to this invention; and FIG. 9 is an enlarged view of the release button of the camera stand of FIG. 8.

DETAILED DESCRIPTION OF THE PREFERRED EMBODIMENT

Because photographic apparatus is well known, the present description will be directed in particular to apparatus forming part of, or cooperating more directly with, a camera stand in accordance with the present invention. It is to be understood that elements of photographic apparatus not specifically shown or described may take various forms well known to those skilled in the art.

Figure 1:
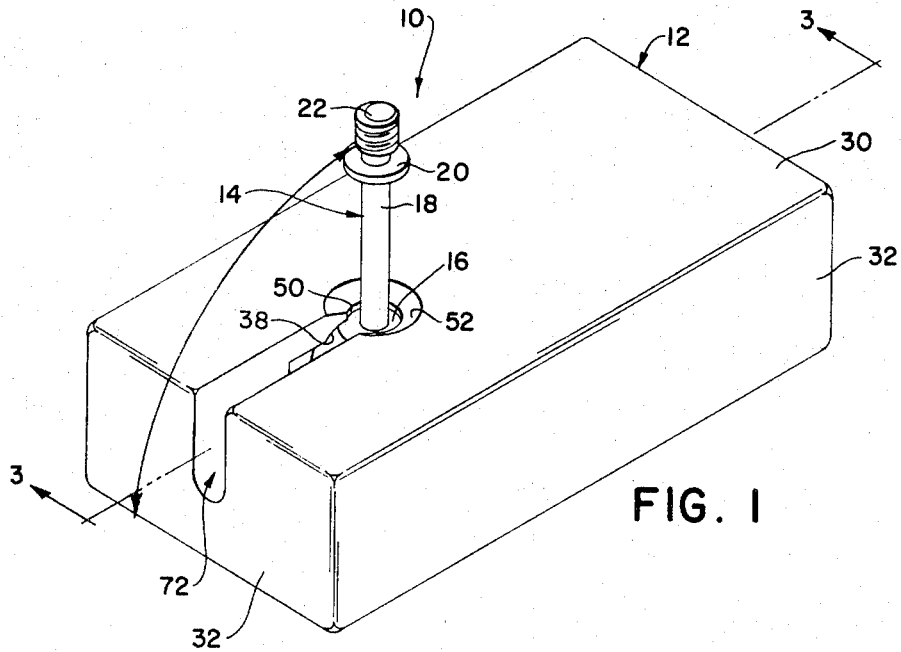
FIG. 1 shows a perspective view of a camera stand according to the present invention, with the support arm in its upright position.
Figure 2:
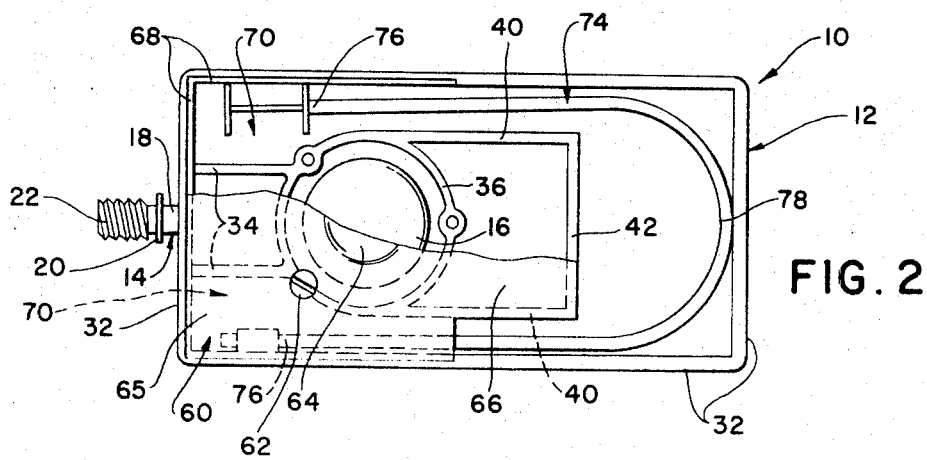
FIG. 2 is a bottom view of the camera stand of FIG. 1, with the cover spring partially cut away to reveal the inner portions of the base.
Figure 3:
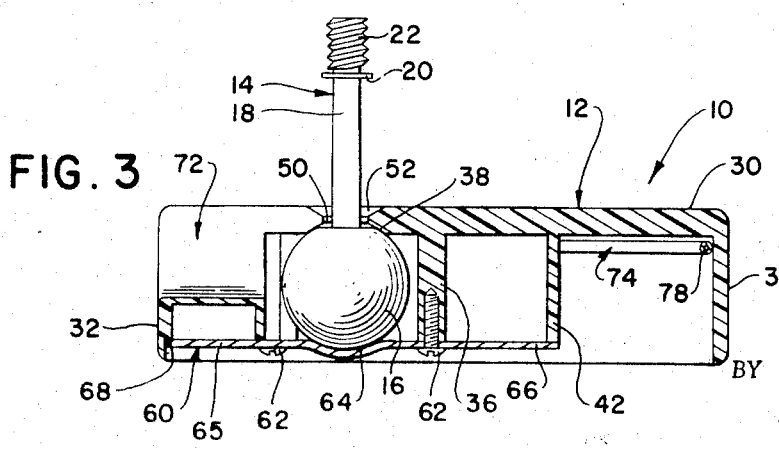
FIG. 3 is a sectional view of the camera stand along the line 3—3 in FIG. 1.

Referring first to FIGS. 1–4, a camera stand shown generally as 10 includes a base 12 and a support arm 14. Support arm 14 consists of a ball head 16 at one end thereof, a shaft 18 extending from ball head 16, a flange 20 at the opposite end of shaft 18 from ball head 16, and a screw end 22 extending from flange 20. End 22 is threaded so as to mate with a suitable receptacle in a camera which is to be mounted on camera stand 10. End 22 could be replaced by any means which is suitable for mating with an accessory receptacle in a camera.

Base 12 includes a generally flat upper wall 30 and four downwardly depending sidewalls 32 which cooperate with wall 30 to define a generally box-shaped base 12. The interior of base 12 is substantially hollow and includes a first pair of walls 34 which depend from upper wall 30 and which extend inwardly from sidewall 32 into the interior of base 12. Walls 34 terminate at a generally cylindrical wall 36, which extends downwardly from a bearing 38 in wall 30. A second pair of walls 40, also depending from wall 30, extend generally from the opposite side of wall 36 from walls 34, further into the interior of base 12 and terminate in a crosswall 42 which depends from wall 30 and which intersects both walls 40.

Bearing 38 includes an aperture 50, which communicates with an aperture 52 in upper wall 30. Bearing 38 is preferably spherical and of such a radius as to mate with ball head 16 of support arm 14 when ball head 16 is inserted within cylindrical wall 36 and shaft 18 is inserted through aperture 50. A cover spring 60 is mounted to the lower surface of wall 36 by means of screws 62. Cover spring 60 has a curved central portion 64, a flat transverse portion 65 and a flat, longitudinal portion 66. Central portion 64 is spherical and of such a radius as to mate with ball head 16 of support arm 14 so as to produce a frictional force upon ball head 16 under the urging of screws 62. Transverse portion 65 extends across the entire width of base 12 and fits into a lip 68 which extends across the lower portion of that sidewall 32 which intersects walls 34 and partially along each sidewall 32 which intersects that sidewall 32. Longitudinal portion 66 of cover spring 60 is generally rectangular and extends longitudinally within base 12 so as to cover the recess defined by walls 40 and cross-wall 42. It may be seen that cover spring 60, in cooperation with sidewalls 32, walls 34, cylindrical wall 36 and walls 40, defines a recess 70 between cover spring 60 and top wall 30, which is partially enclosed by cover spring 60.

Top wall 30 is cut out to form a generally rectangular recess 72 which extends from aperture 52 outwardly towards a sidewall 32. As may best be seen in FIG. 4, recess 72 extends between walls 34 and through that sidewall 32 which intersects walls 34. Recess 72 is of sufficient width to receive shaft 18 of support arm 14 when the support arm is in its stored position.

When camera stand 10 is not in use, support arm 14 may be stored within base 12 by rotating ball head 16 within bearing 38 until shaft 18 rests within recess 72. A cable release 74, with a pair of opposed ends 76 and a central portion 78, may be stored within recess 70 between top wall 30 and cover spring 60 by inserting ends 76 of cable release 74 into recess 70, with the central portion 78 of cable release 72 resting against sidewall 32. Cable release 74 will be held within recess 70 by a combination of cover spring 60 and the frictional force between central portion 78 and sidewall 32. Cable release 74 may be easily removed when desired by grasping central portion 78 and lifting, thereby drawing ends 76 out of recess 70. Camera stand 10 then has a compact configuration, with a stored support arm 14 and a stored cable release 74, and with only screw end 22 extending outwardly of base 12 for ease in coupling support arm 14 to a camera.

In the embodiment illustrated in FIGS. 5–7, an anti-rotation pin is illustrated for assisting the operator in assembling or disassembling the camera stand to a camera. Support arm 14 is identical to that illustrated in FIGS. 1–4 with the exception of ball head 100 of support arm 14 in which a number of slots 102 are formed. As may best be seen in FIG. 7, slots 102 extend along the circumference and through a point on ball head 100 which is opposite shaft 18 of support arm 14. A plunger 110 is mounted on cross-wall 42 of base 12, which plunger extends through an aperture 111 in walls 36, and includes an anti-rotation pin 112 adapted for insertion into a slot 102 in ball head 100. Plunger 110 is spring biased by a spring 114, held between cylindrical wall 36 and a flange 116 on plunger 110, so that pin 112 is held out of slot 102. When the operator desires to assemble the camera stand to a camera, plunger 110 is pressed inwardly so that pin 112 enters a slot 102 in ball head 100, thereby holding support arm 14 against rotation as the camera is screwed onto screw end 22 of support arm 14. Disassembly of the camera from stand 10 may also be aided by pressing inwardly on plunger 110 and thereby preventing ball head 100 from rotating as the camera is unscrewed.

FIGS. 8 and 9 illustrate an alternate embodiment of an anti-rotation pin for the camera stand. A support arm 200 consists of a shaft 202 and a ball head 204 in which is formed an anti-rotation slot 206. One or more similar slots 206 may be formed around the circumference of ball head 204, so that a slight rotation of ball head 204 will bring one of the slots to the desired position for locking against rotation. An aperture 208 is formed in a cover spring 209 which communicates with one of the slots 206.

A base 210 includes a top wall 212 and an access door 214 which is rotatably mounted on a pin 216 fixedly mounted to top wall 212 of base 210. Door 214 is made of a resilient material and terminates in a latch end 218 which includes a latch 220, a release button 221 and a cam surface 222. Latch 220 fits within an aperture 224 located in a bottom wall 226 of base 210 and may be freed from aperture 224 by pressing upward on button 221 to open access door 214.

A lever arm 228 is pivotally mounted on a pin 230 which is fixedly attached to bottom wall 226 of base 210. A first end 232 of lever 228 rests upon cam surface 222 of latch end 218. A second other end 234 of lever arm 228 rests against a flange 236 on an anti-rotation pin 238 which is axially aligned with slot 206 in ball head 204. Pin 238 is spring biased so as to enter slot 206 by a spring 240 which is compressively held between flange 236 and bottom wall 226 of base 210.

FIG. 8 illustrates the camera stand with support arm 200 in its stored position and with pin 238 held within slot 206 of ball head 204. The screw end on support arm 200 may now be inserted into the camera which is to be supported by the camera stand and ball head 204 will not rotate. Ball head 204 is then released for movement of support arm 200 to its extended position by pressing inwardly on button 221, thereby forcing cam surface 222 upwardly against end 232 of lever 228 and causing lever 228 to rotate in a counter-clockwise direction about pin 230. Pin 238 is moved downwardly out of slot 206, thereby freeing ball head 204 and permitting support arm 200 to be moved upwardly out of its storage position in base 210. Access door 214 may also be opened at this time to gain access to the interior of base 210 for removal of the cable release which may be stored as described hereinbefore.

Lever 228 will be held in its counter-clockwise position by engagement of pin 238 with ball head 204 until support arm 200 is returned to its stored position. Pin 238 will then be moved under the bias of spring 240 so that it re-enters slot 206 in ball head 204 to prevent rotation of ball head 204 as the stand is removed from the camera. Access door 214 may be closed at any time, with support arm 200 in either its stored or extended position. If support arm 200 is in its extended position, lever 228 is held in its counter-clockwise position by pin 238 and door 214 may be rotated about pin 216 until latch 220 engages aperture 224. If support arm 200 is in its stored position, as illustrated, cam surface 222 will rotate lever 228 in a counter-clockwise direction, thereby permitting latch 220 to engage aperture 224.

The invention has been described in detail with particular reference to the preferred embodiments thereof, but it will be understood that variations and modifications can be effective within the spirit and scope of the invention.

We claim:

1. A stand for supporting photographic apparatus and for storing a cable release, said stand comprising: means for supporting photographic apparatus; and a base having:
   1. means for receiving said photographic apparatus support means; and
   2. means defining a pair of open ended recesses, the open ends of which are spaced from each other for receiving for storage opposite ends of a cable release.

2. A stand for supporting photographic apparatus and for storing a cable release, said stand comprising: an apparatus support arm having a ball head at one end thereof;
   a base having a generally hollow interior and including bearing means for receiving said ball head; and
   resilient cover means for movably engaging said ball head with said bearing means, and for covering a portion of the interior of said base to form a hollow recess into which the cable release may be at least partially inserted for storage.

3. A stand for supporting photographic apparatus and for storing a cable release, said stand comprising: a base having:
   1. bearing means;
   2. a flat upper wall;
   3. downwardly depending sidewalls forming with said upper wall a generally hollow interior; and
   4. a plurality of interior walls depending from said upper wall within said generally hollow interior and spaced from said sidewalls;
   an apparatus support arm having a ball head at one end thereof, said ball head being receivable by said bearing means; and
   cover means for at least a portion of said generally hollow interior, said cover means including a resilient portion and a wall portion, said resilient portion being positioned in engagement with said ball head so as to movably support said ball head within said bearing means, and said wall portion being positioned in engagement with said plurality of downwardly depending walls within said hollow interior of said base so as to form a hollow recess into which the cable release may be at least partially inserted for storage.

4. A stand for supporting photographic apparatus and for storing a cable release, said stand comprising:
   a photographic apparatus support arm having opposed first and second end portions, said first end portion having means for removably receiving photographic apparatus and said second end portion having a ball head;
   a base having:
   1. a flat upper wall;
   2. at least one wall extending downward from said upper wall to form a bearing recess for movably supporting said ball head, said recess being open on at least its bottom;
   3. sidewalls extending downward from said upper wall and spaced from said bearing recess forming wall to form cable release receiving recesses on opposite sides of said bearing recess forming wall, each of said cable release receiving recesses being open at at least one end to receive opposite ends of a cable release for storage; and
   resilient cover means for closing at least a portion of the bottom of each of said recesses and for frictionally engaging said ball head with said bearing recess.

* * * * *